(12) United States Patent
Ueda et al.

(10) Patent No.: US 9,675,130 B2
(45) Date of Patent: Jun. 13, 2017

(54) SHOE AND METHOD FOR MANUFACTURING THEREOF

(71) Applicants: Takayuki Ueda, Kobe (JP); Masahiro Fujiwara, Kobe (JP)

(72) Inventors: Takayuki Ueda, Kobe (JP); Masahiro Fujiwara, Kobe (JP)

(73) Assignee: ASICS Corporation, Kobe (JP)

( * ) Notice: Subject to any disclaimer, the term of this patent is extended or adjusted under 35 U.S.C. 154(b) by 0 days.

(21) Appl. No.: 14/122,997

(22) PCT Filed: Jan. 24, 2013

(86) PCT No.: PCT/JP2013/051464
§ 371 (c)(1),
(2) Date: Nov. 27, 2013

(87) PCT Pub. No.: WO2014/115284
PCT Pub. Date: Jul. 31, 2014

(65) Prior Publication Data
US 2015/0216258 A1    Aug. 6, 2015

(51) Int. Cl.
| A43B 1/14 | (2006.01) |
| A43B 3/00 | (2006.01) |
| A43B 23/16 | (2006.01) |
| A43B 23/26 | (2006.01) |
| B29D 35/04 | (2010.01) |
| A43B 13/12 | (2006.01) |

(Continued)

(52) U.S. Cl.
CPC ............. *A43B 1/14* (2013.01); *A43B 3/0078* (2013.01); *A43B 13/04* (2013.01); *A43B 13/125* (2013.01); *A43B 23/0235* (2013.01); *A43B 23/0255* (2013.01); *A43B 23/16* (2013.01); *A43B 23/26* (2013.01); *B29D 35/04* (2013.01)

(58) Field of Classification Search
CPC ... A43B 1/14; A43B 23/0215; A43B 23/0235; A43B 23/0295; A43B 13/16; A43B 7/32; A43B 23/0255; A43B 13/26; A43B 13/04; B29D 35/04
USPC ..................................... 36/87, 30 R, 57, 31
See application file for complete search history.

(56) References Cited

U.S. PATENT DOCUMENTS

| 2,034,091 A | 3/1936 | Dunbar |
| 2,147,197 A * | 2/1939 | Glidden .......................... 36/9 R |
| 4,150,455 A | 4/1979 | Fukuoka |

(Continued)

FOREIGN PATENT DOCUMENTS

| CS | 71731 | 2/1943 |
| EP | 1527706 A1 | 5/2005 |

(Continued)

OTHER PUBLICATIONS

English translation of Written Opinion in PCT/JP2013/051464 issued May 7, 2013.

*Primary Examiner* — Khoa Huynh
*Assistant Examiner* — Jocelyn Wu
(74) *Attorney, Agent, or Firm* — Katten Muchin Rosenman LLP

(57) ABSTRACT

A shoe including: a sock-shaped base member forming at least a portion of an upper; a reinforcement member made of a thermoplastic resin welded to side surfaces of the base member on a medial side and a lateral side of a foot; and a mid sole made of a thermoplastic resin welded to a bottom surface of the base member.

11 Claims, 14 Drawing Sheets

(51) Int. Cl.
*A43B 13/04* (2006.01)
*A43B 23/02* (2006.01)

(56) References Cited

U.S. PATENT DOCUMENTS

| | | | |
|---|---|---|---|
| 4,342,160 A | 8/1982 | Clark | |
| 4,447,967 A | 5/1984 | Zaino | |
| 5,106,445 A | 4/1992 | Fukuoka | |
| 5,155,927 A | 10/1992 | Bates et al. | |
| 5,437,112 A * | 8/1995 | Johnston | 36/128 |
| 5,493,792 A | 2/1996 | Bates et al. | |
| 5,533,279 A * | 7/1996 | Mitsui et al. | 36/50.1 |
| 5,667,737 A | 9/1997 | Wittmann | |
| 5,692,319 A * | 12/1997 | Parker et al. | 36/50.1 |
| 5,692,320 A * | 12/1997 | Nichols | 36/51 |
| 5,718,063 A | 2/1998 | Yamashita et al. | |
| 5,885,500 A | 3/1999 | Tawney et al. | |
| D416,381 S | 11/1999 | Senda et al. | |
| 6,029,376 A * | 2/2000 | Cass | A43C 1/04 36/50.1 |
| 6,041,520 A * | 3/2000 | Aoki | 36/14 |
| 6,199,302 B1 | 3/2001 | Kayano | |
| 6,212,795 B1 | 4/2001 | Nakabe et al. | |
| 6,255,235 B1 | 7/2001 | Hiraoka et al. | |
| 6,305,100 B1 * | 10/2001 | Komarnycky | A43B 7/08 36/27 |
| D453,413 S | 2/2002 | Tsujino et al. | |
| 6,438,870 B2 * | 8/2002 | Nasako et al. | 36/28 |
| 6,444,074 B1 * | 9/2002 | Marega et al. | 156/212 |
| 6,467,191 B2 | 10/2002 | Hayashi et al. | |
| 6,467,197 B1 | 10/2002 | Mitsui et al. | |
| 6,516,539 B2 | 2/2003 | Nishiwaki et al. | |
| 6,562,271 B2 | 5/2003 | Hiraoka et al. | |
| 6,601,323 B2 | 8/2003 | Tsujino et al. | |
| 6,647,646 B2 | 11/2003 | Mitsui et al. | |
| 6,685,011 B2 | 2/2004 | Nishiwaki et al. | |
| 6,763,615 B2 | 7/2004 | Mitsui et al. | |
| 6,769,202 B1 * | 8/2004 | Luthi | A43B 13/184 36/28 |
| D495,859 S | 9/2004 | Kubo et al. | |
| D495,860 S | 9/2004 | Kubo et al. | |
| D496,148 S | 9/2004 | Kayano et al. | |
| 6,789,333 B2 | 9/2004 | Nishiwaki et al. | |
| D501,713 S | 2/2005 | Kayano et al. | |
| D501,987 S | 2/2005 | Kubo et al. | |
| D509,351 S | 9/2005 | Kayano et al. | |
| D512,208 S | 12/2005 | Kubo et al. | |
| D512,818 S | 12/2005 | Mitani et al. | |
| D512,819 S | 12/2005 | Usuki et al. | |
| D512,827 S | 12/2005 | Usuki et al. | |
| D512,828 S | 12/2005 | Kubo et al. | |
| D513,115 S | 12/2005 | Kayano et al. | |
| D514,286 S | 2/2006 | Kayano et al. | |
| D518,283 S | 4/2006 | Kayano et al. | |
| D520,732 S | 5/2006 | Mitani et al. | |
| D522,229 S | 6/2006 | Kubo et al. | |
| D527,174 S | 8/2006 | Kayano et al. | |
| 7,082,699 B2 | 8/2006 | Nishiwaki et al. | |
| D527,516 S | 9/2006 | Kayano et al. | |
| D528,761 S | 9/2006 | Kayano et al. | |
| D542,522 S | 5/2007 | Fujita et al. | |
| 7,254,907 B2 | 8/2007 | Nishiwaki et al. | |
| D552,833 S | 10/2007 | Yamashita et al. | |
| D553,846 S | 10/2007 | Kayano et al. | |
| 7,322,131 B2 | 1/2008 | Yamashita et al. | |
| D561,434 S | 2/2008 | Fujita et al. | |
| D561,442 S | 2/2008 | Kayano et al. | |
| 7,325,323 B2 | 2/2008 | Katsu et al. | |
| 7,325,336 B2 | 2/2008 | Yamashita et al. | |
| D571,086 S | 6/2008 | Yamashita et al. | |
| D571,090 S | 6/2008 | Fujita et al. | |
| 7,380,354 B2 | 6/2008 | Yamashita et al. | |
| D575,486 S | 8/2008 | Yamashita et al. | |
| D575,946 S | 9/2008 | Mitani et al. | |
| D582,658 S | 12/2008 | Fujita et al. | |
| 7,613,588 B2 | 11/2009 | Katsu et al. | |
| D614,855 S | 5/2010 | Inohara et al. | |
| 7,779,558 B2 | 8/2010 | Nishiwaki et al. | |
| 7,784,198 B2 * | 8/2010 | Roudebush | 36/112 |
| 7,823,298 B2 * | 11/2010 | Nishiwaki et al. | 36/88 |
| 7,877,899 B2 | 2/2011 | Nishiwaki et al. | |
| 7,987,618 B2 | 8/2011 | Nishiwaki et al. | |
| 8,008,363 B2 | 8/2011 | Mori et al. | |
| D650,566 S | 12/2011 | Yamashita et al. | |
| 8,074,377 B2 | 12/2011 | Nishiwaki et al. | |
| 8,112,909 B2 | 2/2012 | Kubo et al. | |
| D659,371 S | 5/2012 | Yano et al. | |
| 8,272,148 B2 | 9/2012 | Nishiwaki et al. | |
| 8,375,602 B2 | 2/2013 | Takada et al. | |
| 8,418,379 B2 | 4/2013 | Nishiwaki et al. | |
| 8,453,344 B2 | 6/2013 | Nishiwaki et al. | |
| 8,461,222 B2 | 6/2013 | Mori et al. | |
| 8,544,190 B2 | 10/2013 | Nishiwaki et al. | |
| 8,584,378 B2 * | 11/2013 | Weidl et al. | 36/45 |
| 8,590,345 B2 * | 11/2013 | Sokolowski et al. | 66/177 |
| 8,844,167 B2 * | 9/2014 | Greene | 36/45 |
| 2004/0181974 A1 | 9/2004 | Robinson et al. | 36/100 |
| 2004/0261295 A1 * | 12/2004 | Meschter | 36/45 |
| 2005/0268497 A1 * | 12/2005 | Alfaro et al. | 36/136 |
| 2007/0068047 A1 * | 3/2007 | Alfaro et al. | 36/136 |
| 2007/0107259 A1 * | 5/2007 | Kilgore et al. | 36/31 |
| 2008/0010855 A1 * | 1/2008 | Fuerst | 36/31 |
| 2008/0028640 A1 * | 2/2008 | Lacorazza | 36/97 |
| 2008/0229617 A1 * | 9/2008 | Johnson et al. | 36/102 |
| 2008/0295263 A1 * | 12/2008 | Meschter et al. | 12/146 C |
| 2010/0005684 A1 | 1/2010 | Nishiwaki et al. | |
| 2010/0307027 A1 | 12/2010 | Nakanishi et al. | |
| 2011/0041362 A1 | 2/2011 | Nishiwaki et al. | |
| 2011/0197468 A1 * | 8/2011 | Kubo et al. | 36/28 |
| 2011/0197475 A1 * | 8/2011 | Weidl et al. | 36/107 |
| 2012/0000095 A1 * | 1/2012 | Torrance | 36/132 |
| 2012/0030965 A1 * | 2/2012 | Greene et al. | 36/10 |
| 2012/0124866 A1 | 5/2012 | Moriyasu et al. | |
| 2012/0131818 A1 | 5/2012 | Nishiwaki et al. | |
| 2012/0198722 A1 | 8/2012 | Imazato et al. | |
| 2012/0204446 A1 * | 8/2012 | Tateishi et al. | 36/83 |
| 2012/0216422 A1 | 8/2012 | Ikezawa et al. | |
| 2012/0297643 A1 * | 11/2012 | Shaffer et al. | 36/83 |
| 2013/0008053 A1 * | 1/2013 | Nishiwaki et al. | 36/102 |
| 2013/0104422 A1 * | 5/2013 | Hatfield et al. | 36/103 |
| 2013/0312284 A1 * | 11/2013 | Berend et al. | 36/84 |
| 2014/0059896 A1 * | 3/2014 | Weidl et al. | 36/25 R |
| 2014/0075779 A1 * | 3/2014 | Bruce et al. | 36/29 |
| 2014/0259779 A1 * | 9/2014 | Hashish et al. | 36/100 |
| 2015/0013187 A1 * | 1/2015 | Taniguchi et al. | 36/84 |
| 2015/0082668 A1 * | 3/2015 | Nonogawa et al. | 36/30 R |

FOREIGN PATENT DOCUMENTS

| | | |
|---|---|---|
| FR | 2484215 A1 | 12/1981 |
| GB | 1491634 A | 11/1977 |
| GB | 2479220 | 10/2011 |
| GB | 2482933 B | 7/2012 |
| JP | S50-71132 U | 6/1975 |
| JP | S50-98928 U | 8/1975 |
| JP | S50-140637 U | 11/1975 |
| JP | S53-40350 A | 4/1978 |
| JP | S53-77742 A | 7/1978 |
| JP | 2003-265202 A | 9/2003 |
| JP | 2004-105323 A | 4/2004 |
| JP | 2007-050157 A | 3/2007 |
| JP | 2007-236612 A | 9/2007 |
| WO | WO-2009/112438 A1 | 9/2009 |
| WO | WO-2012/022967 A1 | 2/2012 |
| WO | WO-2013/121578 A1 | 8/2013 |

\* cited by examiner

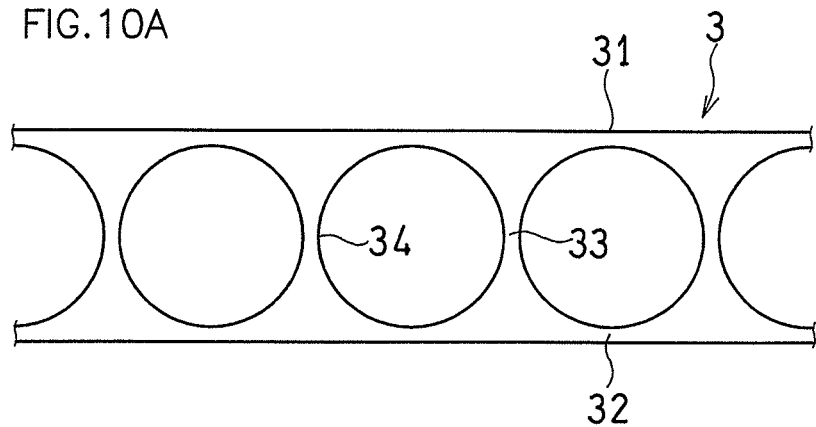
FIG.10A
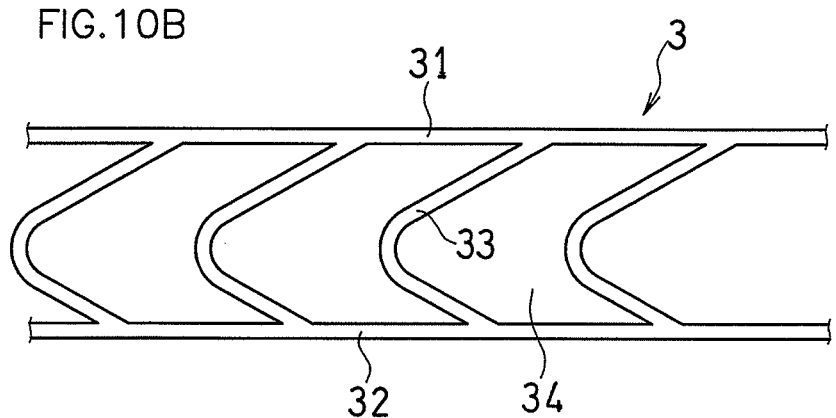
FIG.10B
FIG.10C
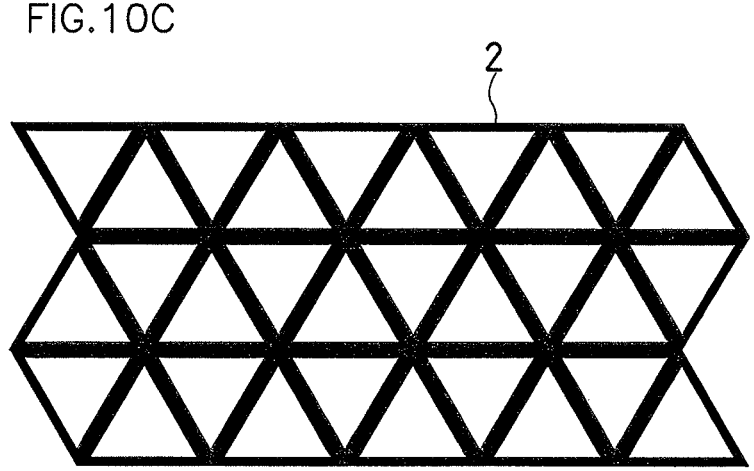

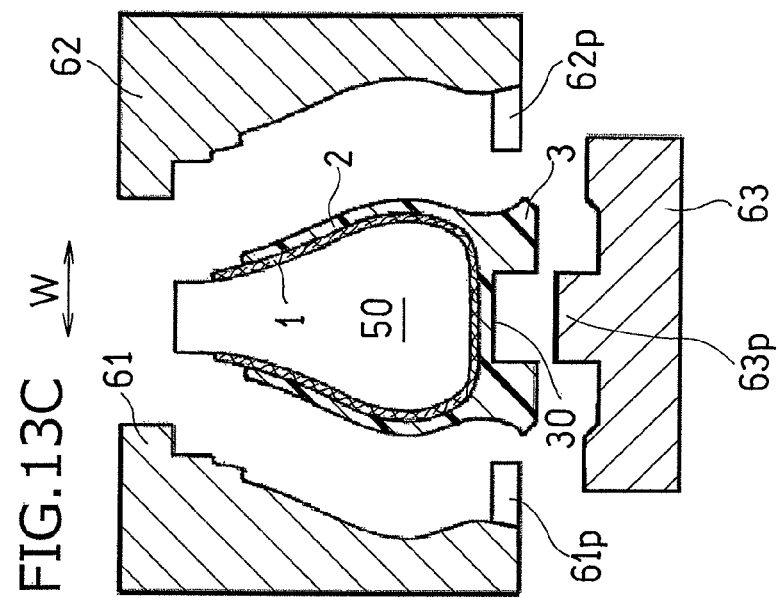
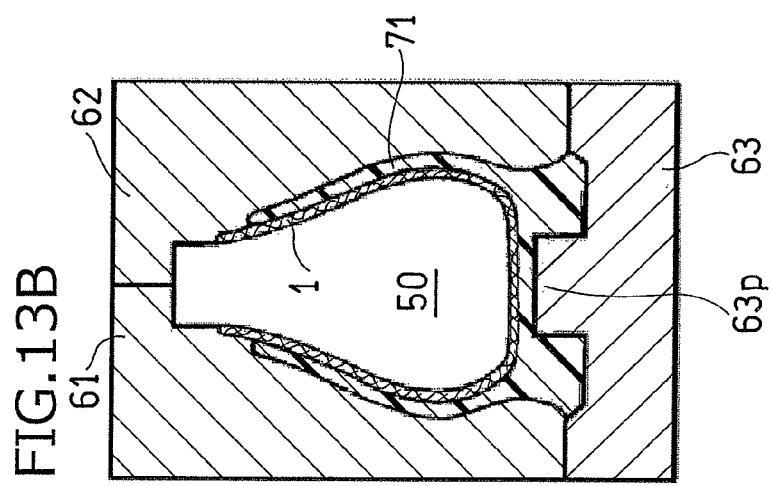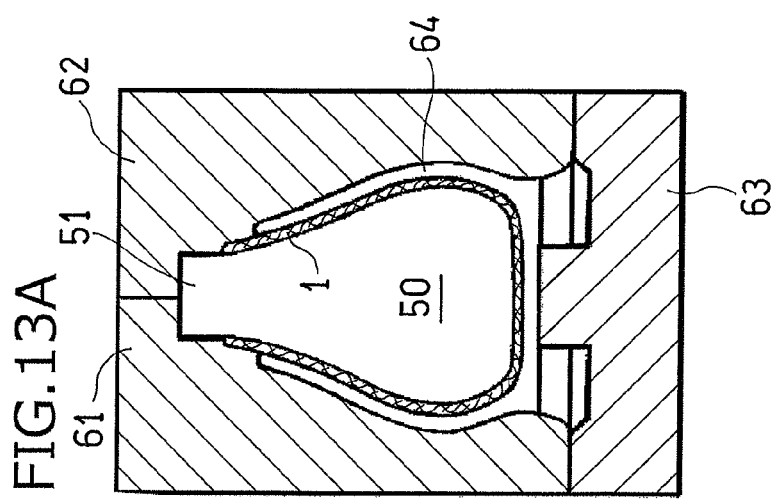

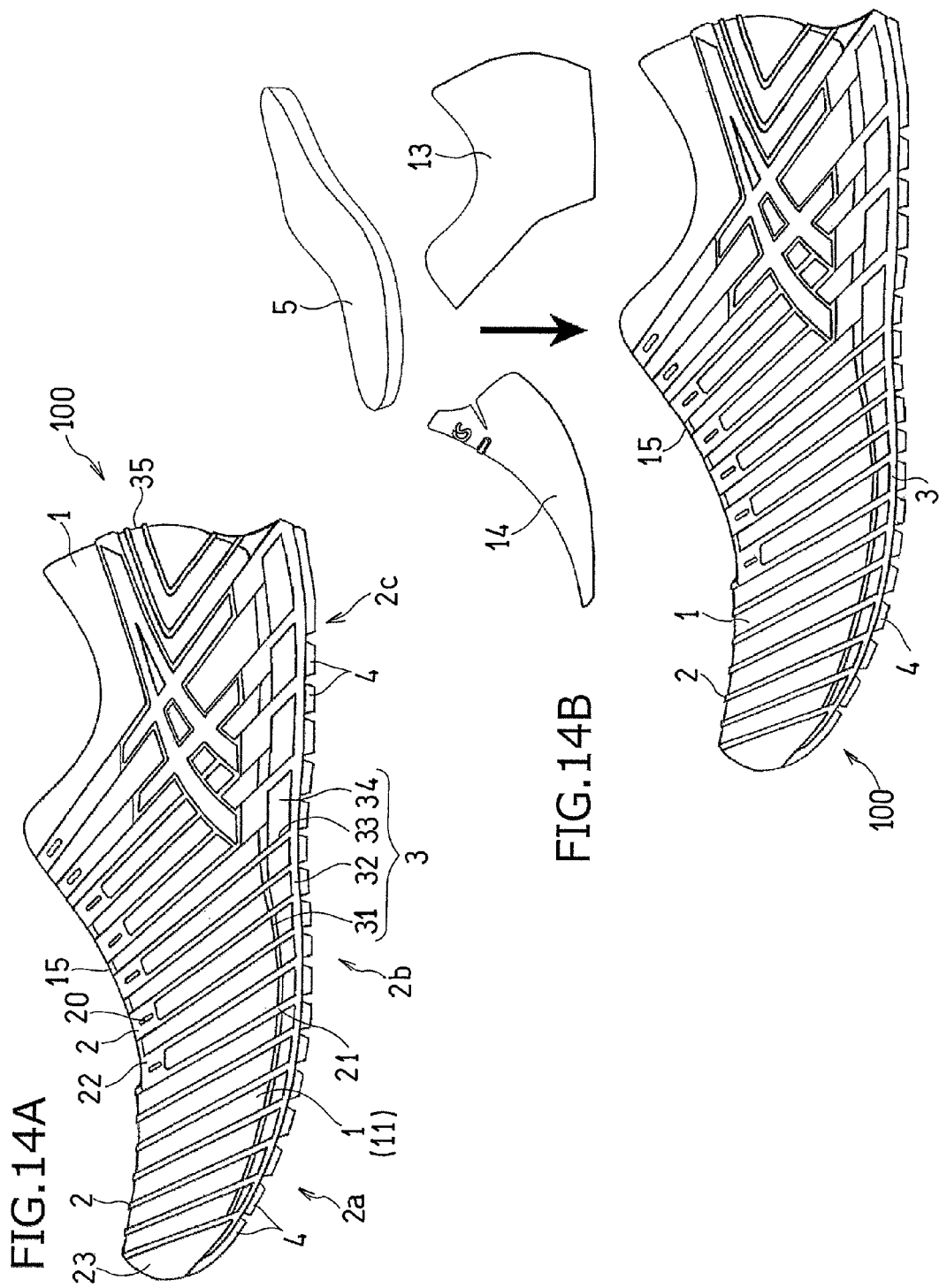

SHOE AND METHOD FOR MANUFACTURING THEREOF

CROSS-REFERENCE TO RELATED APPLICATIONS

This application is a U.S. National Phase application under 37 U.S.C §371 of Patent Cooperation Treaty Application No. PCT/JP2013/051464, filed on Jan. 24, 2013, entitled Shoe and Method for Manufacturing Thereof, the contents of which are incorporated by reference herein.

TECHNICAL FIELD

The present invention relates to a shoe using a sock-shaped upper member, and a method for manufacturing the same.

BACKGROUND ART

While shoe parts are produced by machines, operations of assembling the parts together are typically done manually in many cases. Such operations require skilled persons, making quality control difficult and increasing running costs.

In view of this, various methods have been proposed in the art for mechanically coupling together parts of a shoe (First to Fourth Patent Documents).

CITATION LIST

Patent Literature

First Patent Document: JP2004-105323A (Abstract)
Second Patent Document: JP2003-265202A (FIG. 2)
Third Patent Document: JP2007-236612A (Abstract)
Fourth Patent Document: JP2007-050157A (Paragraphs 0019-0026)

SUMMARY OF INVENTION

With these conventional techniques, however, it will not be possible to sufficiently solve the problems described above.

Thus, it is an object of the present invention to provide a shoe and a method for manufacturing the same, with which it is possible to reduce the amount of manual operations as much as possible.

A shoe of the present invention includes: a sock-shaped base member 1 forming at least a portion of an upper 12; a reinforcement member 2 made of a thermoplastic resin welded on a side surface 11 of the base member 1 on the medial side Me and the lateral side La of the foot; and a mid sole 3 made of a thermoplastic resin welded to a bottom surface 10 of the base member 1.

In the present invention, the base member 1 of the upper 12 is reinforced by the reinforcement member 2, and the reinforcement member 2 made of the resin is welded to the sock-shaped base member 1. Therefore, in the production of the upper 12, the flexible sock-shaped base member 1 can be put on a last, and the reinforcement member 2 can easily be welded integral with the base member 1, thereby significantly reducing the sewing step of sewing the reinforcement member 2 to the base member 1, making the production of the upper 12 easy.

On the other hand, the mid sole 3 made of the resin is welded to the bottom surface, i.e., a surface covering the foot sole, of the sock-shaped base member 1. Therefore, most or all of the shoe manufacturing steps can be done by molding both the reinforcement member 2 and the mid sole 3 on the base member 1 by using a mold.

The sock-shaped base member 1 means that a tube-like member, with at least the mouth (wearing opening) thereof being open, is included, but a portion other than the mouth, e.g., the instep, the toe and a portion of the foot sole, may be open, as long as the shape is such that it can be put on a last.

In the present invention, the base member 1 may be a member whose primary member is a knit fabric, a knit-like fabric and/or a woven fabric, as well as a member whose primary member is a synthetic leather or a resin sheet, and a member that is composed of two or more of these. Note that the term "primary member" means one of the members of the base member 1 that accounts for a greatest proportion.

Where the sock-shaped base member 1 is a knit fabric or a woven fabric, it may be produced by a well-known knitting machine or weaving machine, or a knit fabric or a woven fabric may be sewn into a sock shape. A knit-like fabric means a fabric having a macroscopically-stitch fabric structure, i.e., a lattice structure. The knit-like fabric uses a knit-like whole cloth, in which case it easily fits the shape of the last because it is knit-like.

Where the base member 1 is made of one or two or more of a knit fabric, a knit-like fabric and a woven fabric (hereinafter referred to collectively as a "knit fabric, etc."), or where a primary member thereof is one or two or more of the knit fabric, etc., the reinforcement member 2 and the mid sole 3 are secured by an anchoring effect. That is, part of the resin of the reinforcement member 2 and the mid sole 3 welded to the base member 1 runs into the reticulated structure of the base member 1. Therefore, the reinforcement member 2 and the mid sole 3 are integrated together with the base member 1 by virtue of the anchoring effect.

On the other hand, where the base member 1 is formed by a resin member that softens or shrinks at the temperature used for molding, the reinforcement member 2 and the mid sole 3 are welded and secured to the base member 1 even if the anchoring effect cannot be obtained, i.e., even if the base member 1 has a smooth surface.

The reinforcement member 2 and the mid sole 3 are not essentially sewn to the base member 1 and are welded to the surface of the base member 1 so that the reinforcement member 2 and the mid sole 3 are integrated together with the upper 12. Herein, "not essentially sewn to" means that "portions of the reinforcement member around or in the vicinity of eyelets or around or in the vicinity of loops may be sewn to the base member 1", for example. Where there are a plurality of reinforcement members, only some of them may be sewn.

The upper 12 may be produced by sewing some parts, such as the tongue and the quarter lining, to the sock-shaped base member 1.

While there are no limitations on the hardness of the resin of the reinforcement member 2 and the mid sole 3, those having a hardness of about 80° to 90° as defined in JIS K 6253A can be employed preferably. The resin is not limited to a non-foam, but may also be a foamed body if the expansion ratio is small.

For example, the resin may be non-foamed body or foamed body of an ethylene-vinyl acetate copolymer (EVA), urethane-based, styrene-based, or, olefin-based resin. The type or hardness of the resin may be equal or different between the reinforcement member 2 and the mid sole 3, for example.

BRIEF DESCRIPTION OF DRAWINGS

FIGS. 10A and 10B are enlarged side views each showing another shape of the mid sole, and FIG. 10C is an unfolded view showing, on an enlarged scale, another shape of the reinforcement member.

FIGS. 13A to 13C are process diagrams each showing a part of the process.

FIGS. 14A and 14B are process diagrams each showing a part of the process.

DESCRIPTION OF EMBODIMENTS

Figure 1:
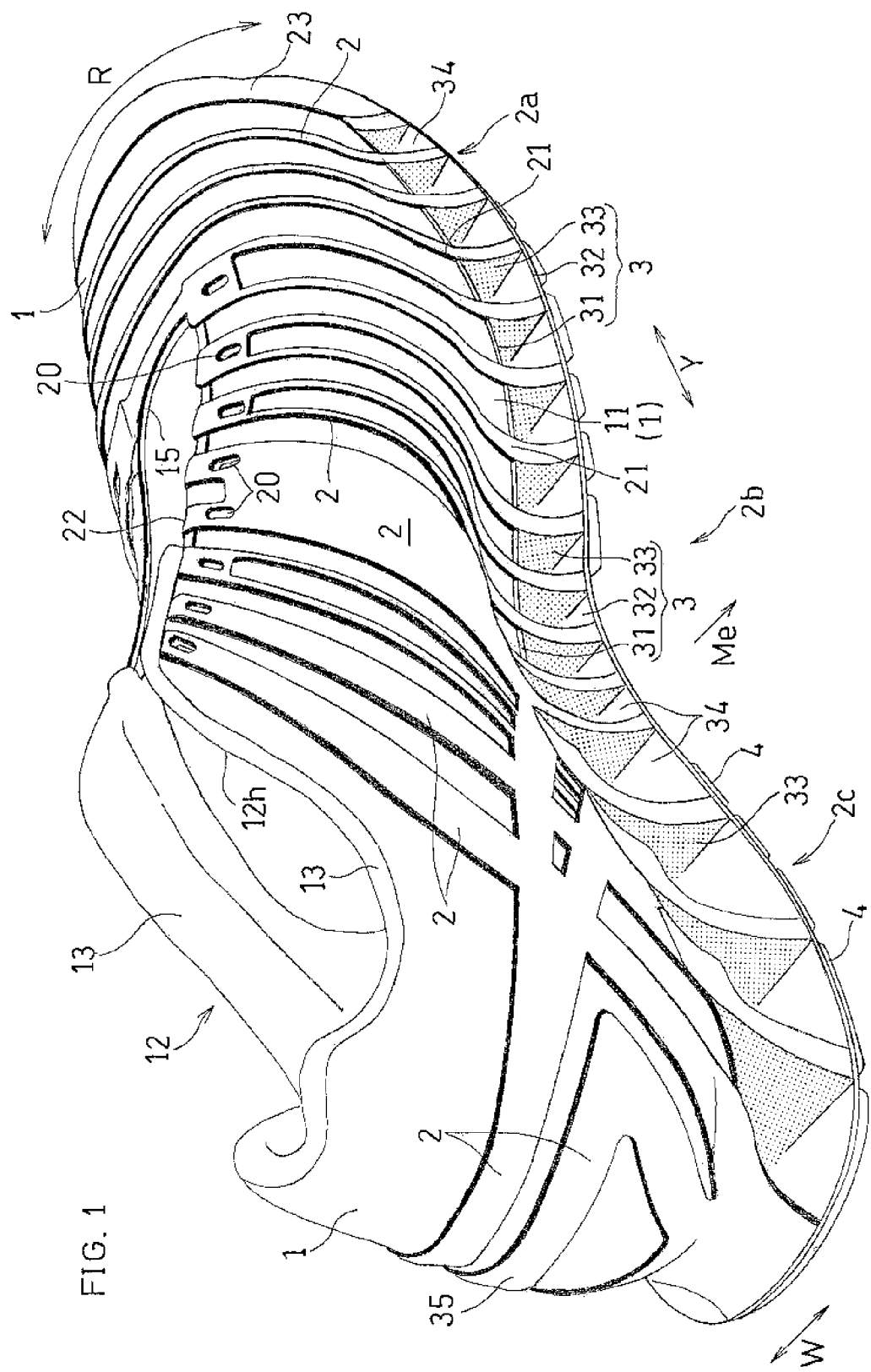
FIG. 1 is a perspective view showing a shoe of Embodiment 1 of the present invention, with the tongue removed, as seen from a diagonally rear direction from the medial side of the foot.

Preferably, the mid sole 3 includes an upper plate 31 welded to the bottom surface 10 of the base member 1, a lower plate 32 placed below the upper plate 31 while being spaced apart from the upper plate 31, and a plurality of connecting portions 33 connecting between the upper plate 31 and the lower plate 32, and the connecting portions 33 being deformable by a load from above; and the upper plate 31, the lower plate 32, and the plurality of connecting portions 33 are integrally molded together.

In this case, the connecting portions 33 between the upper and lower plates 31 and 32 of the mid sole 3 deform, thereby allowing the reinforcement member 2 and the mid sole 3 to be molded in a single molding operation even with a resin of a small expansion ratio or a resin of a non-foamed body.

In an ordinary shoe, a foamed body having a relatively large expansion ratio is used in the mid sole. While such a foamed body having a large expansion ratio is taken out of the mold after the molding process is complete, the volume thereof then increases by the amount of foaming. Therefore, it is preferred that the reinforcement member 2 and the mid sole 3 are formed by a non-foamed body or a foamed body having a small expansion ratio.

Note that a foamed body can be used if the expansion ratio is greater than 1.0 and 1.1 or less, and can be used preferably if the expansion ratio is greater than 1.0 and 1.05 or less.

The mid sole 3 may be formed by a single flat plate, for example.

Preferably, the plurality of connecting portions 33 are a plurality of connecting plates 33, and the upper plate 31, the lower plate 32, and the plurality of connecting plates 33 define a through hole 34 passing through in the width direction of the shoe.

With the through holes 34 running through in the width direction of the shoe, the connecting portions 33 can easily deform. Therefore, even with a resin of a non-foamed body, a shock-absorbing function is obtained by virtue of the deformation of the connecting plates 33.

Preferably, the upper plate 31, the lower plate 32, and the connecting portions 33 are placed on the medial side Me and the lateral side La of the foot, and the lower plate 32 and the connecting portions 33 are, at least in an area, each spaced apart between the medial side Me and the lateral side La, the mid sole 3 thereby defining a depressed area 30 hollowed upwardly between the medial side Me and the lateral side La.

In this case, the medial side Me and the lateral side La of the foot are supported by the mid sole 3, and the reaction force from the road surface is unlikely to occur on the foot sole in the middle between the medial side and the lateral side. Thus, the shock-absorbing function is increased.

Preferably, the reinforcement member 2 extends in a circumference direction R of the foot, and a lower edge 21 of the reinforcement member 2 is continuous with the mid sole 3.

Herein, the circumference direction R of the foot includes a direction along the foot circumference, and means a direction of a loop that connects together the upper surface of the instep of the foot, the medial side and the lateral side, and the foot sole. Therefore, "to extend in the circumference direction R of the foot" encompasses directions inclined forward or backward with respect to the foot circumference. Moreover, "to extend in the circumference direction R" includes cases where the reinforcement member 2 having a lattice pattern is welded to the base member 1, as long as it is extending at least in the circumference direction R.

The reinforcement member 2 extending in the circumference direction R as described above suppresses stretching of the base member 1 in the circumference direction R. Thus, the upper 12 stably supports the foot even if the base member 1 is flexible.

Preferably, the resins forming the reinforcement member 2 and the mid sole 3 are made of the same resin material.

In this case, the reinforcement member 2 and the mid sole 3 can easily be molded simultaneously in a single molding process.

Preferably, the reinforcement member 2 extends in the circumference direction R of the foot, and the lower edge 21 of the reinforcement member 2 is continuous with the mid sole 3; and the resins forming the reinforcement member 2 and the mid sole 3 are the same resin material and are made of a non-foamed body.

In this case, the reinforcement member 2 and the mid sole 3 are continuous with each other, thereby increasing the strength of the lower edge 21 of the reinforcement member 2, and the support of the foot by the upper 12 is likely to be stable. A molten resin is likely to run from the mid sole 3 into multiple reinforcement members 2 in the mold during the manufacture of the shoe.

Preferably, the resins of the reinforcement member 2 and the mid sole 3 are a non-foamed body.

In this case, the resin, which is a non-foamed body, does not expand after the molding process. Therefore, the shape of the upper 12, including the reinforcement member 2 and the mid sole 3 welded to the base member 1, is likely to be an intended shape.

Moreover, the resin of a non-foamed body provides a significant effect of reinforcing the base member 1, and therefore the stabilization function of the upper 12 wrapping around the foot is likely to be exerted even if the base member 1 is a flexible member formed by a knit fabric, etc.

Preferably, the reinforcement member 2 covers the opposing side surfaces 11 of the midfoot, and an eyelet 20 is formed in an upper edge portion 22 of the reinforcement member 2.

In this case, since the resin forming the reinforcement member 2 typically has a higher rigidity than the base member 1 and the eyelet 20 is formed in the upper edge portion 22 of the reinforcement member 2 having a high rigidity, the reinforcement member 2 can be pulled up by means of a shoelace, or the like, passing through the eyelet 20 so as to fit the base member 1 to the foot together with the reinforcement member 2. Therefore, even with the base member 1 having a low rigidity, the upper and the sole are likely to fit the foot, and the foot is stably supported because the foot is supported from both sides by means of the reinforcement member 2.

Preferably, the reinforcement member 2 includes a heel counter 35 welded to the base member 1.

In this case, since the heel counter 35 is formed integrally with the base member 1, it is possible to stably support the heel of the foot even with the base member 1 having a low rigidity.

Preferably, an outsole 4 is further included, welded or bonded to a lower surface of the mid sole 3 and having a greater abrasion resistance than the mid sole 3.

Herein, the outsole 4 means a tread sole to be in contact with the road surface, and is typically formed by a rubber foamed body or non-foamed body. Such a rubber cannot be used in an injection molding, as opposed to a thermoplastic resin.

The reinforcement member 2 and the mid sole 3 are formed by a thermoplastic resin in the present invention. Therefore, it is possible, by injection molding, to easily mold a shoe in which the reinforcement member 2 and the mid sole 3 are welded to the base member 1.

Note that the mid sole 3 is arranged between the base member 1 and the outsole 4, and will not typically be in contact with the ground while walking on a flat road surface.

A shoe of the present invention is produced by the following method, for example. That is, a method according to one aspect of the present invention includes the steps of; putting the sock-shaped base member 1 forming a portion of the upper 12 on a last portion 52 of a core 50 having the last portion 52; loading the core 50 between first and second outer molds 61 and 62 meshing each other in a width direction of the shoe; clamping together the first and second outer molds 61 and 62; supplying a molten resin 71 to be the reinforcement member 2 and the mid sole 3 between the first and second outer molds 61 and 62 and the base member 1; allowing the molten resin 71 to cure, thereby integrally forming the reinforcement member 2 and the mid sole 3 on the base member 1; and opening the first and second outer molds 61 and 62.

In this case, only by performing the operation of putting the base member 1 on a last (the core 50) and further loading the core 50 between the outer molds 61 and 62, it is possible to manufacture, by injection molding, a shoe in which the reinforcement member 2 or the mid sole 3 is integral with the base member 1. Therefore, the manufacture of the shoe is mechanized, and it is possible to reduce the production cost and to realize a stable quality even if the worker is not skilled.

Note that the base member 1 may be a sock that is stretchable and does not shrink by heat. That is, the base member 1 can be used as long as it can be put on a last and it fits to the last.

Preferably, a third outer mold 63 is further included, meshing with the first and second outer molds 61 and 62 and opposing a sole portion (the bottom of the foot) of the last portion 52, and the core 50 is loaded between the first, second and third outer molds 61, 62 and 63.

In this case, it is possible to mold the mid sole 3 having various bottom surface shapes by appropriately setting the shape of the third outer mold 63 opposing the sole portion.

Preferably, the third outer mold 63 includes, at the center between the medial side Me and the lateral side La of the foot, a protruding portion 63p projecting toward the base member 1, the protruding portion 63p forming the depressed area 30 at the center of the mid sole 3.

In this case, the depressed area 30 is formed at the center of the mid sole 3, reducing the weight of the mid sole 3.

Moreover, it will be possible to support the medial side Me and the lateral side La of the foot by the mid sole 3, and to soften the shock against the foot sole with the portion of the depressed area 30 in the center.

The present invention will be understood more clearly from the following description of preferred embodiments taken in conjunction with the accompanying drawings. Note however that the embodiments and the drawings are merely illustrative and should not be taken to define the scope of the present invention. The scope of the present invention shall be defined only by the appended claims. In the accompanying drawings, like reference numerals denote like components throughout the plurality of figures.

EMBODIMENTS

Embodiments of the present invention will now be described with reference to the drawings.

FIGS. 1 to 7B show Embodiment 1.

Figure 2:
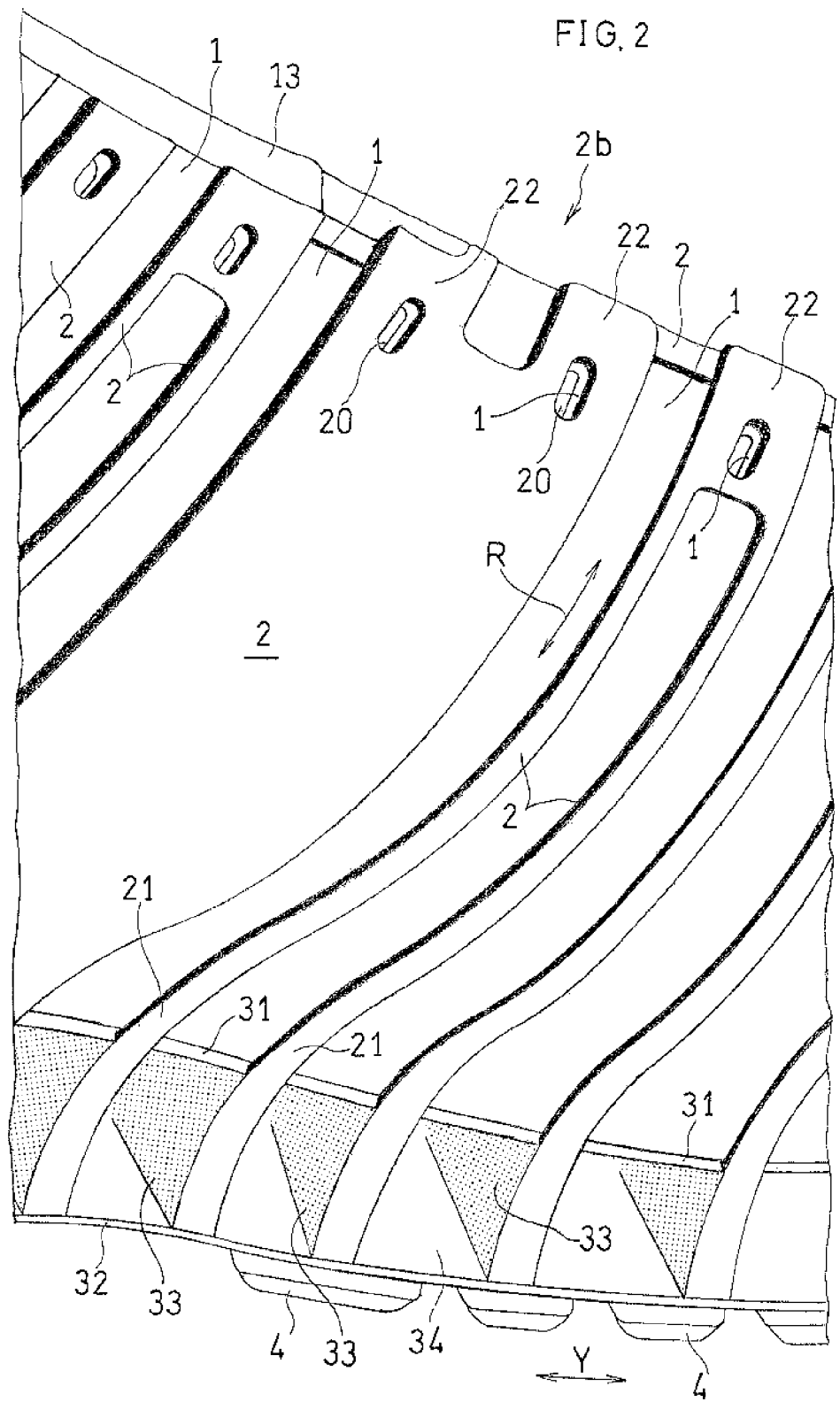
FIG. 2 is a perspective view showing, on an enlarged scale, the medial surface of a middle foot portion of the shoe.
Figure 3:
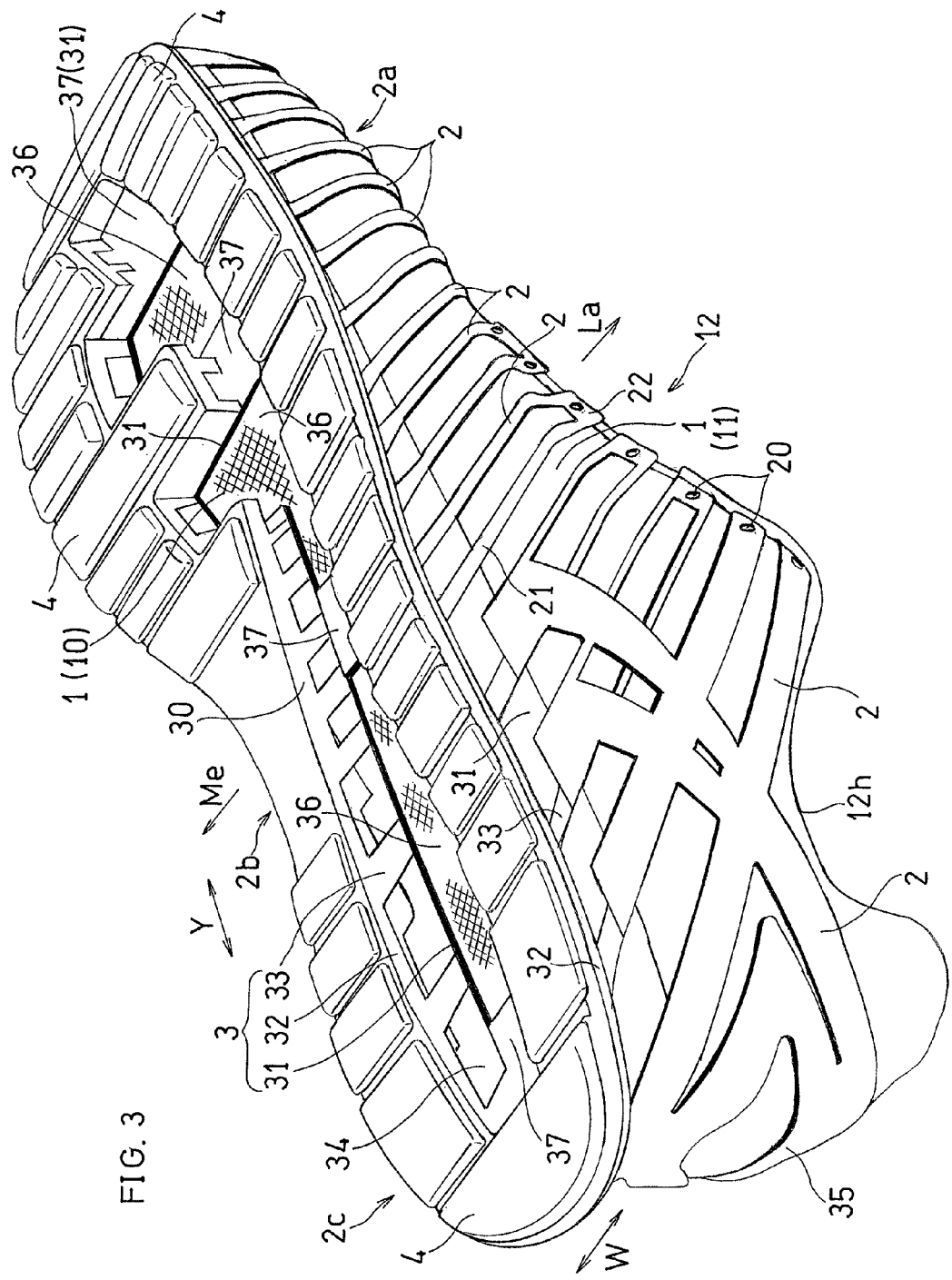
FIG. 3 is a perspective view of the shoe as seen from a diagonally rear direction from the lateral side of the foot on the bottom surface side.
Figure 7A:
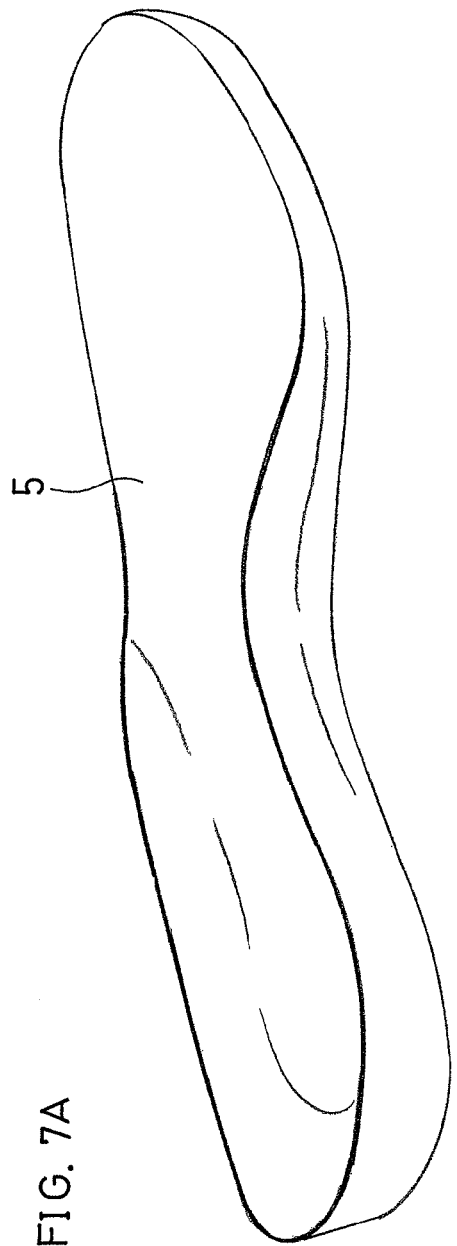
FIG. 7A is a perspective view of an innersole as seen from the medial side.

As shown in FIGS. 1 to 7B, the shoe is formed by the base member 1, the reinforcement member 2, the mid sole 3 and the outsole 4 of FIG. 1, and an innersole 5 of FIG. 7A. Note that in FIGS. 1 to 3, areas representing the thickness of the reinforcement member 2 are painted in solid black for ease of understanding of the drawings. In FIGS. 4B, 5B and 6B, areas of the reinforcement member 2 and the mid sole 3 formed by a resin are painted in solid black.

The base member 1 of FIG. 1 is formed in a sock shape by a knit fabric, a knit-like fabric and a woven fabric, for example. The base member 1 may have a two-layered structure including a knit fabric, etc. that is less stretchable in the front-rear direction of the foot and a knit fabric, etc. that is less stretchable in the foot circumference direction, for example.

In the present embodiment, the base member 1 includes the side surface 11 covering the lateral side La of the foot of FIG. 3 and the side surface 11 covering the medial side Me of FIG. 1, while including the bottom surface 10 of FIG. 3 covering the foot sole. The bottom surface 10 and the opposing side surfaces 11 may be sewn to each other.

Furthermore, the medial and lateral side surfaces 11 and 11 may be sewn to each other at the rear end, for example.

In FIG. 1, a quarter lining 13 is bonded to, and then sewn to, a mouth (wearing opening) 12h of the base member 1 and the reverse side under the mouth 12h. Note that the quarter lining 13 is for giving a rigidity to the mouth 12h, and makes the mouth 12h stronger against damage.

Figure 4A:
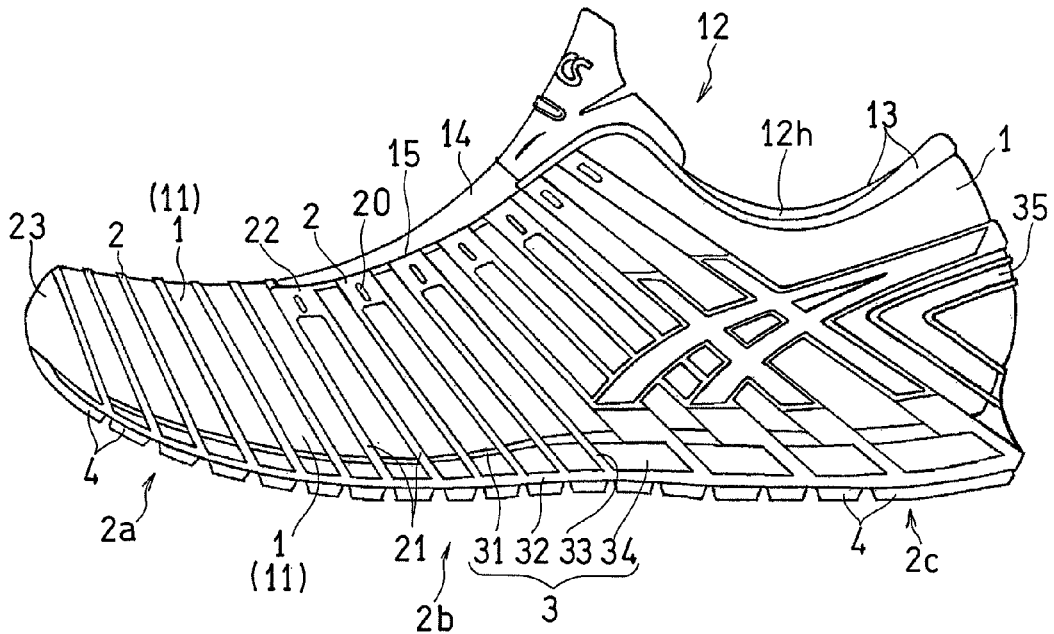
FIG. 4A is a lateral side view of the shoe.
Figure 5A:
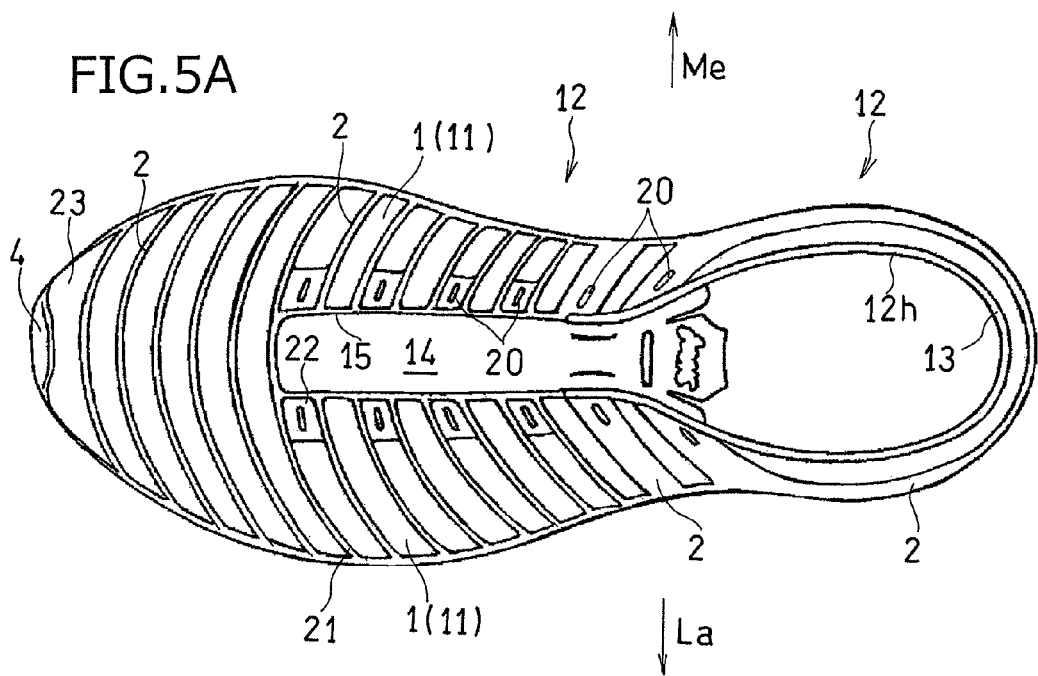
FIG. 5A is a plan view of the shoe.
Figure 5B:
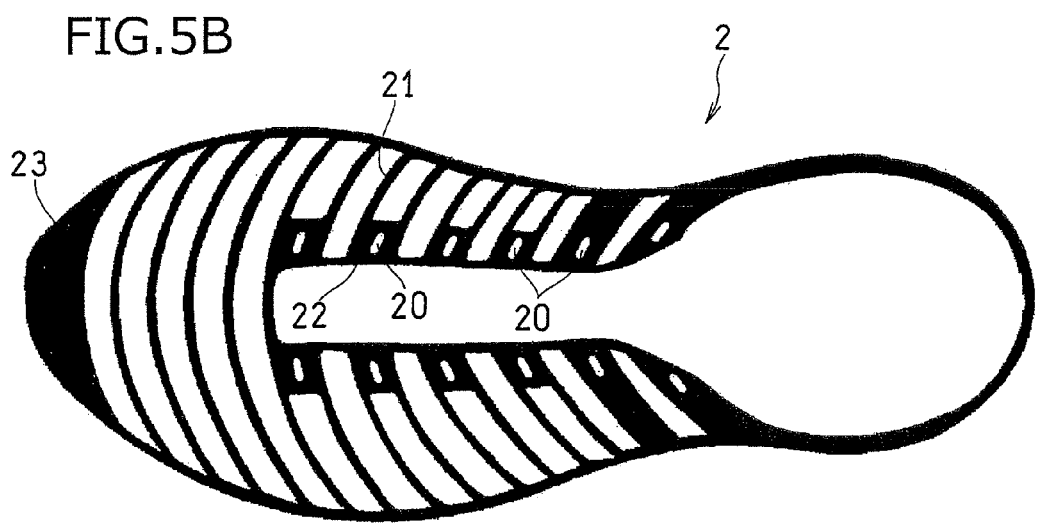
FIG. 5B is a plan view where areas of the reinforcement member and the mid sole are painted in solid black.
Figure 6A:
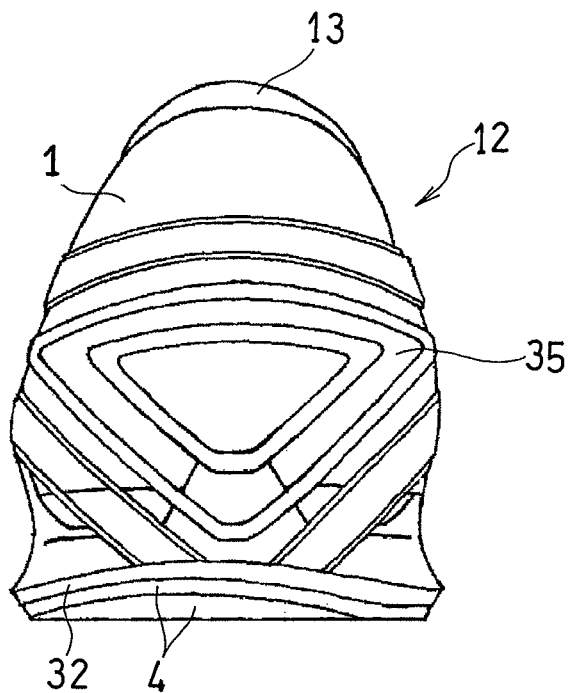
FIG. 6A is a rear view of the shoe.
Figure 6B:
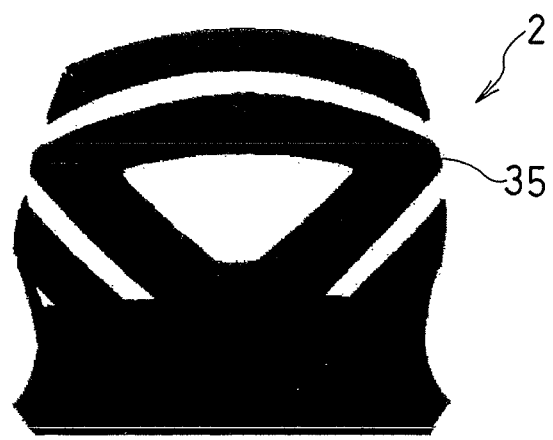
FIG. 6B is a rear view where areas of the reinforcement member and the mid sole are painted in solid black.

As shown in FIGS. 4A and 5A, an opening 15 to be closed by a tongue 14 is provided continuous with and in front of the mouth 12h. The tip of the tongue 14 is sewn to the base member 1 in the vicinity of the opening 15.

Note that the tongue 14 and the opening 15 are not always necessary in the present invention, and a highly stretchable fabric may be sewn to the area of the opening 15 as in a ballet shoe, for example.

In FIG. 1, the reinforcement member 2 and the mid sole 3 are made of a non-foamed body of a thermoplastic resin of the same type, for example, and are integrally molded together and welded to the base member 1. The reinforcement member 2 is welded to the side surfaces 11 of the base member 1 on the medial side Me and the lateral side La of the foot. The mid sole 3 is welded to the bottom surface 10 of the base member 1 of FIG. 3.

Figure 4B:
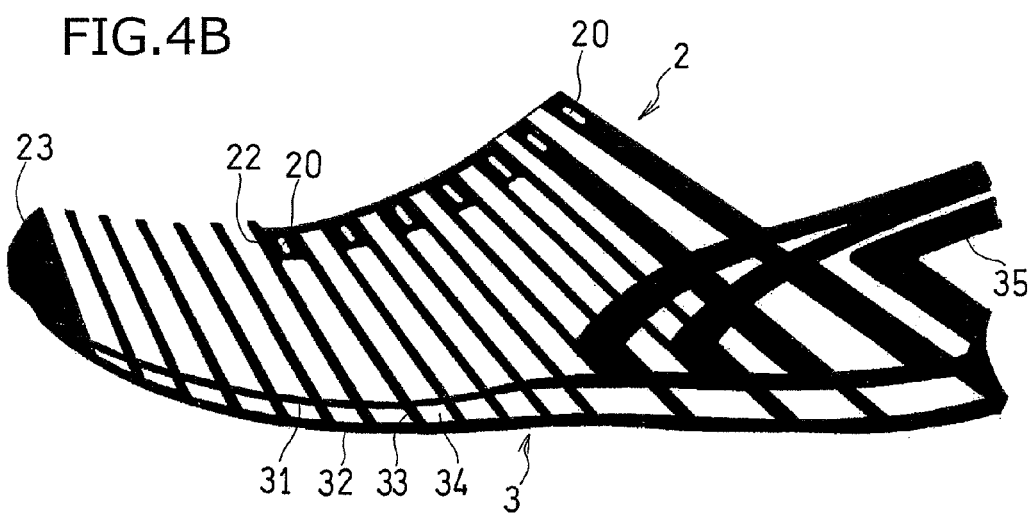
FIG. 4B is a lateral side view where areas of the reinforcement member and the mid sole are painted in solid black.

As clearly shown in FIGS. 4A and 4B, the mid sole 3 includes the upper plate 31, the lower plate 32 and a plurality of connecting plates (connecting portions) 33 integrally molded together. The upper plate 31 of FIG. 3 is welded to the bottom surface 10 of the base member 1. The lower plate 32 is placed below the upper plate 31 while being spaced apart from the upper plate 31. The outsole 4, which has a higher abrasion resistance than the mid sole 3, is welded or bonded to the bottom surface of the lower plate 32.

The connecting plates 33 shown in FIG. 1 connect between the upper plate 31 and the lower plate 32, and are deformable by a load from above. The upper plate 31, the lower plate 32, and the plurality of connecting plates 33 define through holes 34 passing through in the width direction W of the shoe. For example, the connecting plates 33 are placed in a forwardly inclined position, as shown in FIG. 4B, and exhibit shear deformation and flexural deformation by a load from above.

As shown in FIG. 4A, a connecting plate 33 partitions adjacent through holes 34 and 34 from each other, resulting in an alternating array of connecting plates 33 and through holes 34.

As shown in FIG. 3, the upper plate 31, the lower plate 32 and the connecting plate 33 are placed at least on the medial side Me and the lateral side La of the foot. The lower plate 32 and the connecting plate 33 are each spaced apart between the medial side Me and on the lateral side La. Thus, the mid sole 3 defines the depressed area 30 hollowed upwardly between the medial side Me and the lateral side La. Note that the portions of the lower plate 32 on the medial side Me and the lateral side La are continuous with each other at the front end and the rear end of the sole to form a loop shape.

As shown in FIG. 3, in the present embodiment, a plurality of cutouts 36 are formed in the upper plate 31 of the mid sole 3. The cutouts 36 are closed by the base member 1. Note that portions of the base member 1 placed in the cutouts 36 may be removed.

In FIG. 3, areas of the base member 1 closing the cutouts 36 are cross-hatched. Areas representing the thickness of the upper plate 31 of the mid sole 3 are painted in solid black.

The upper plate 31 includes four bridge plates 37. The bridge plates 37 are spaced apart from one another in the front-rear direction Y of the foot, thereby forming three cutouts 36 between the bridge plates 37.

As shown in FIGS. 1 and 2, the reinforcement member 2 extends in the circumference direction R. The lower edge 21 of the reinforcement member 2 is continuous with the mid sole 3.

The reinforcement member 2 covers midfoot portions of the opposing side surfaces 11. The eyelet 20 is formed in the upper edge portion 22 of the reinforcement member 2 on each of the opposing side surfaces 11.

That is, as shown on an enlarged scale in FIG. 2, in a middle foot portion 2b, each reinforcement member 2 is continuous with the upper plate 31 and the connecting plate 33 of the mid sole 3 and is extending to the edge of the opening 15. Moreover, since the eyelet 20 is formed in the upper edge portion 22 of the reinforcement member 2, the upper 12 will easily fit to the foot and the support of the foot will be stable.

As shown in FIG. 5A, the reinforcement member 2 may be provided along the opening 15 between adjacent upper edge portions 22 and 22.

An eyelet 10h is formed in the base member 1 corresponding to the eyelet 20 of the reinforcement member 2. Note that the upper edge portion 22 of the reinforcement member 2 may be provided with, instead of the eyelets 20 and 10h, a loop through which a shoelace is to pass, a U-shaped metal part, or the like, or a resin-made engagement part with which a shoelace is to engage.

The reinforcement member 2 of FIG. 1 includes the heel counter 35 welded to the base member 1. The heel counter 35 will serve to keep the shape of the heel portion.

The reinforcement member 2 may be placed so as to surround the mouth portion 12h in a rear foot portion 2c. In the rear foot portion 2c, some of the reinforcement members 2 may be shaped in backward inclination so that they extend upward as they extend rearward, and may be continuous from the lower edge 21 on the medial side Me of FIG. 1 to the lower edge 21 on the lateral side La of FIG. 3.

On the other hand, in the front foot portion 2a, the reinforcement member 2 may be shaped in anterior inclination so that they extend upward as they extend forward as shown in FIGS. 4A to 5B, and may be continuous from the lower edge 21 on the medial side Me of FIG. 1 to the lower edge 21 on the lateral side La of FIG. 3.

Note that as shown in FIGS. 1 and 4B, the reinforcement member 2 may have a cup-shaped protection section 23 at the front end portion.

Figure 7B:
FIG. 7B is a perspective view of the innersole as seen from the lateral side.

The innersole 5 thicker than normal shown in FIGS. 7A and 7B is put in the upper 12. Note that the innersole 5 may be provided with many (a plurality of) apertures for ventilation.

FIGS. 8A to 9B show another example of a shoe.

In the example of FIGS. 8A to 9B, a second mid sole 3A represented by halftone dots is included in addition to the first mid sole 3.

The second mid sole 3A may be formed by a foamed body of a thermoplastic resin such as EVA, or may be made of a non-foamed body of a styrene-based thermoplastic resin, or the like, and have a rubber-like elasticity. The expansion ratio of the second mid sole 3A may be about 1.15 to 200 as long as it is greater than that of the first mid sole 3, or it may be a normally-employed expansion ratio, e.g., about 1.15 to 70.

Figure 8A:
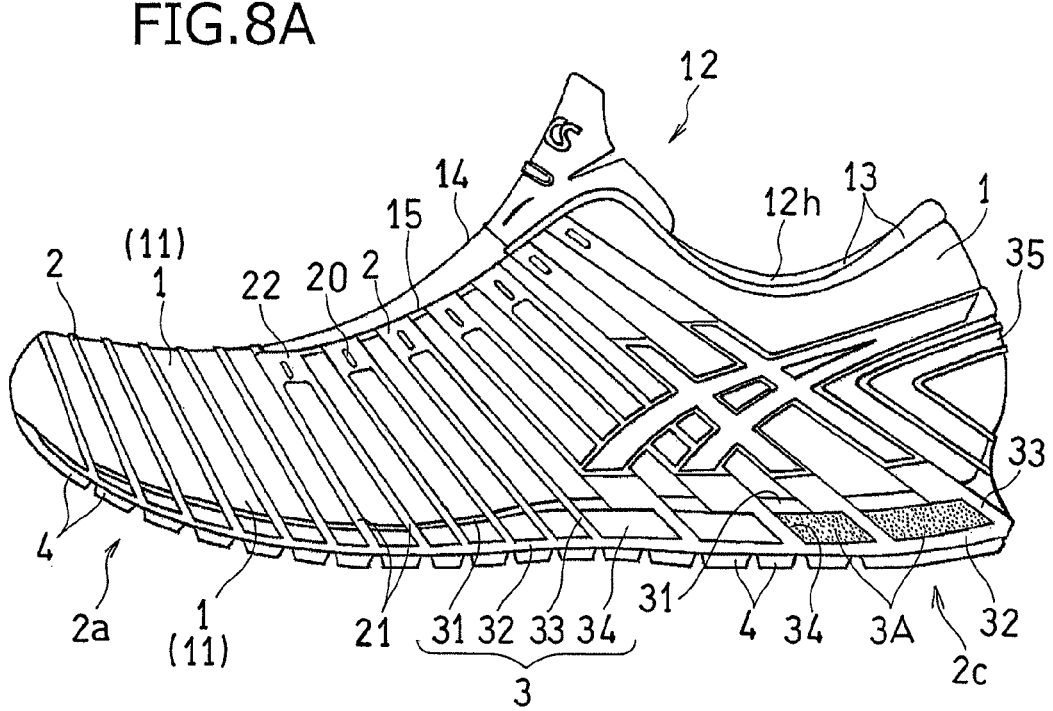
FIG. 8A is a lateral side view showing a shoe of Embodiment 2.

In the example shown in FIG. 8A, the second mid sole 3A is placed so as to fit in one or more through holes 34 of the rear foot portion 2c with no space therebetween. In this case, the second mid sole 3A filling up the through hole 34 may be molded continuously and immediately after molding the non-foamed body portions of the mid sole 3.

Figure 8B:
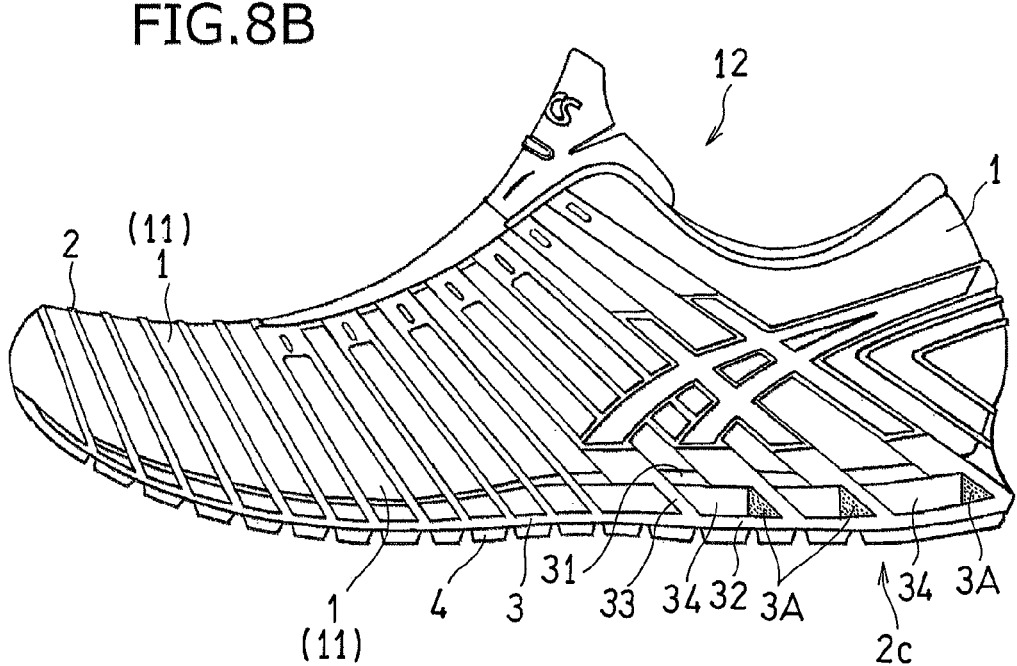
FIG. 8B is a lateral side view showing a shoe of Embodiment 3.

In the example shown in FIG. 8B, the second mid sole 3A is placed so as to fill an acute-angle corner in front of the connecting plate 33. In this case, the second mid sole 3A may be fixed with an adhesive after molding the mid sole 3 or may be provided with a stop portion, such as a depression/protrusion, etc., so that the second mid sole 3A will not come off the first mid sole 3.

Figure 9A:
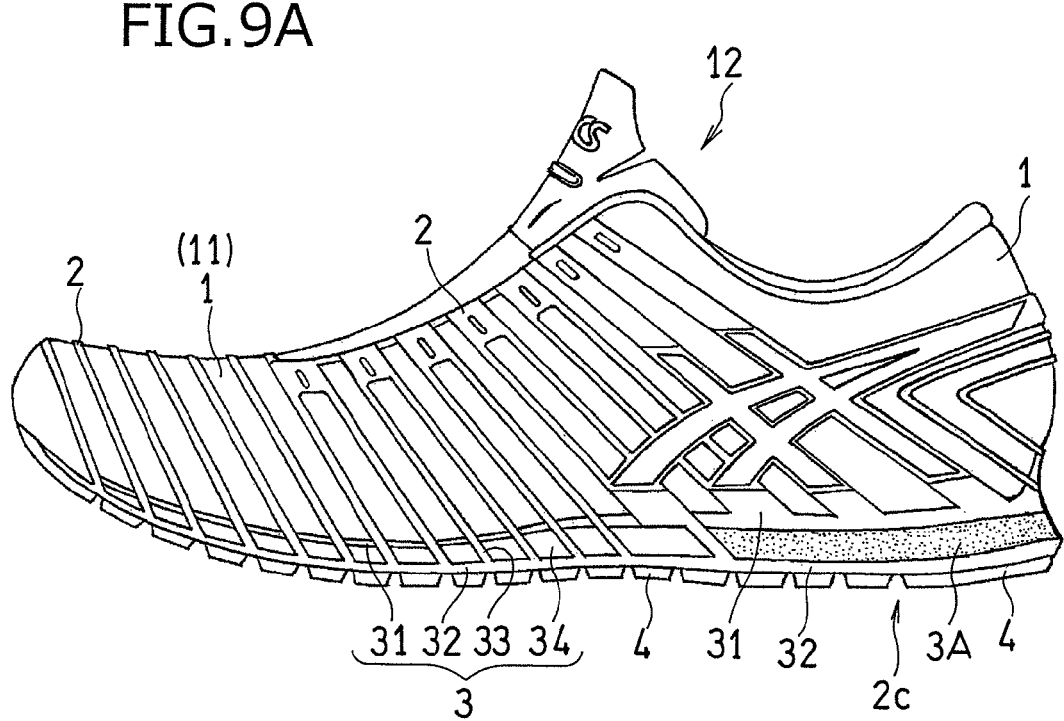
FIG. 9A is a lateral side view showing a shoe of Embodiment 4.

In the example shown in FIG. 9A, the connecting plates 33 are absent in a part or whole of the rear foot portion 2c. In the rear foot portion 2c, the second mid sole 3A is sandwiched between the upper plate 31 and the lower plate 32, resulting in a structure where the upper plate 31, the second mid sole 3A and the lower plate 32 are layered together. Note that the second mid sole 3A may be formed in a U shape or J shape on a planar cross section that is not shown in the figures.

In the example shown in FIGS. 8A to 9A, the second mid sole 3A may not be fixed in the manufacturing process, but second mid soles 3A of different colors and different levels of hardness may be provided in advance, so that the user can select one of such second mid soles 3A the user likes, and attach/detach the selected one.

Figure 9B:
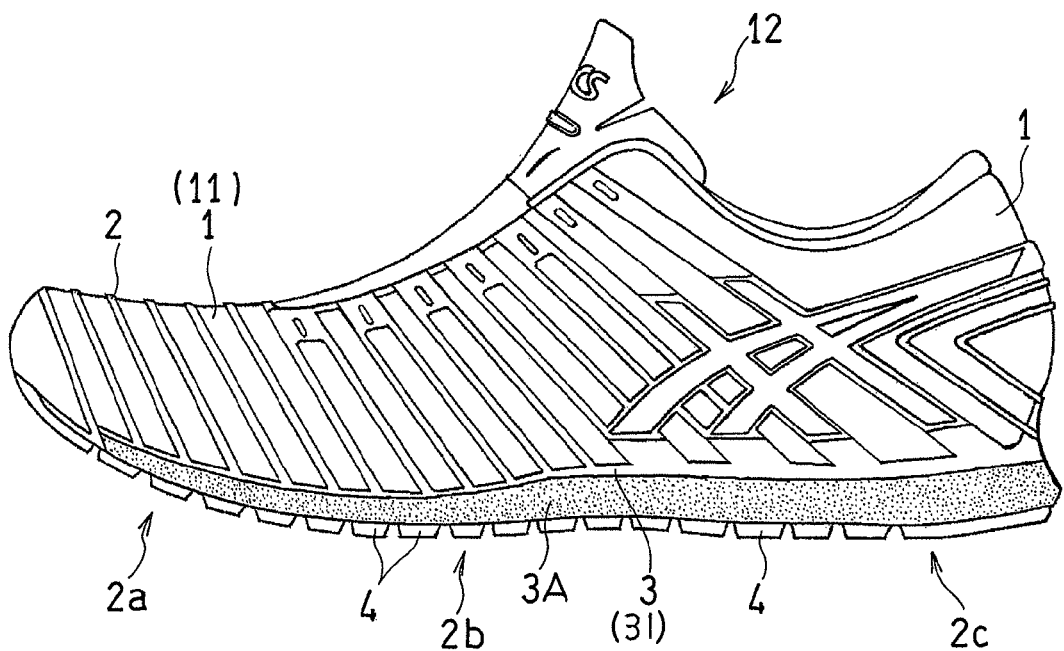
FIG. 9B is a lateral side view showing a shoe of Embodiment 5.
Figure 11:
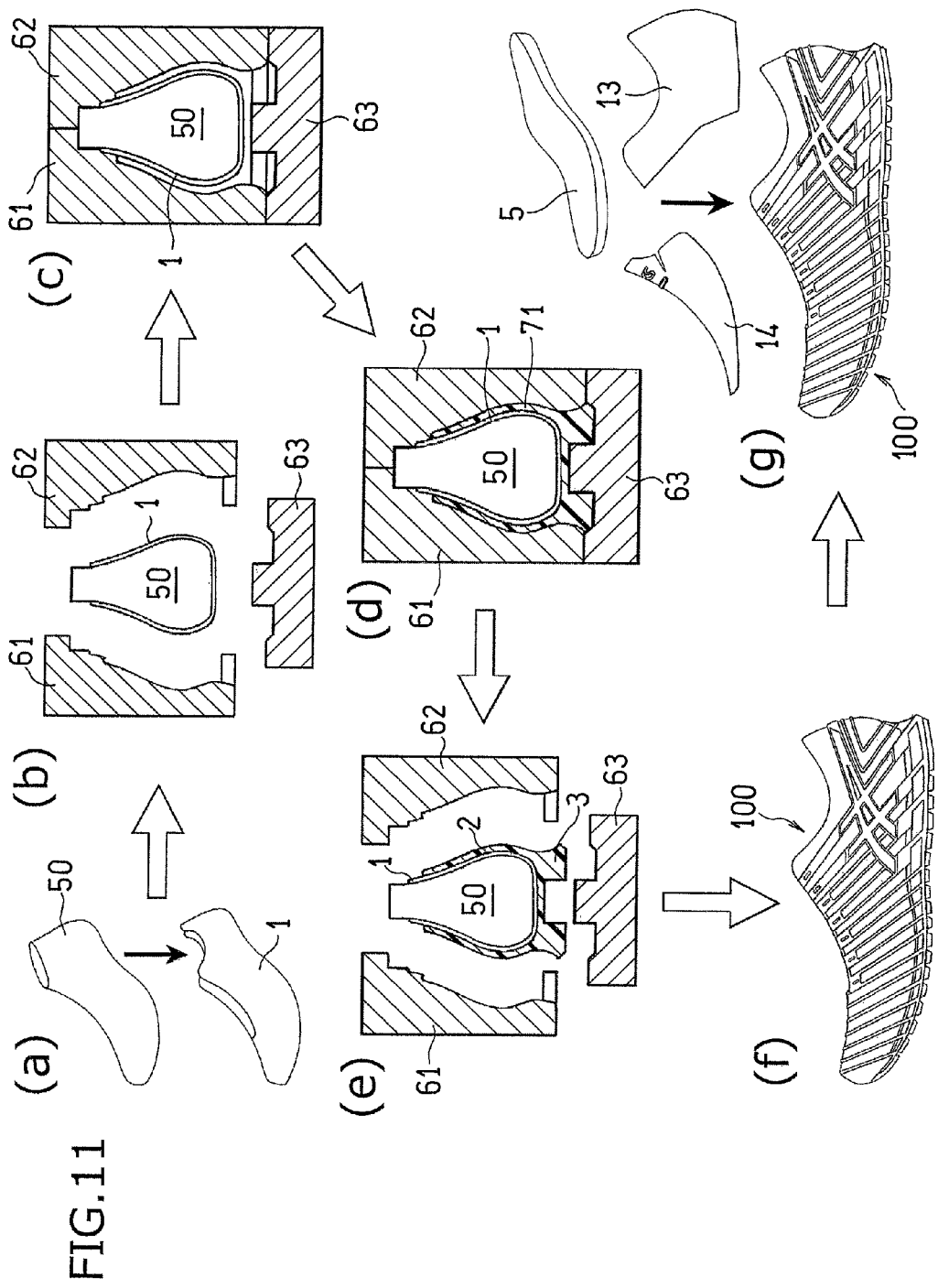
FIGS. 11(a) to 11(g) are process diagrams showing a general scheme of an example manufacturing process of the present invention.

In the example shown in FIG. 9B, most of the mid sole 3 may be formed by the upper plate 31, and the second mid sole 3A made of a foamed body may be welded or bonded under the upper plate 31. In this case, the second mid sole 3A may be an EVA foamed body, obtained through a primary molding in advance, which is integrated together with the mid sole 3 when molding the mid sole 3. The outsole 4 is bonded or welded to the bottom surface of the second mid sole 3A.

FIGS. 10A and 10B show another example of the connecting portion 33.

As shown in FIG. 10A, the connecting portion 33 does not have to be plate-shaped. The connecting portion 33 is not limited to a forwardly inclined plate shape, but may be a plate bent to have a V-shaped cross section as shown in FIG. 10B.

FIG. 10C shows another example of the reinforcement member 2.

The reinforcement member 2 does not need to be in the shape of lines generally parallel to one another, but may be in a lattice shape as shown in FIG. 10C. The shape of the lattice may be rectangular or hexagon, as well as triangular.

Note that the other configurations of these alternative examples are similar to those of Embodiment 1 shown in FIGS. 1 to 7B, and therefore will not be shown in the figures or discussed in detail below.

Next, an example of a method for manufacturing a shoe of Embodiment 1 will be described with reference to FIGS. 11 to 14B.

In the manufacturing method of the present embodiment, the core 50 and the first to third outer molds 61 to 63 are provided in advance.

Figure 12A:
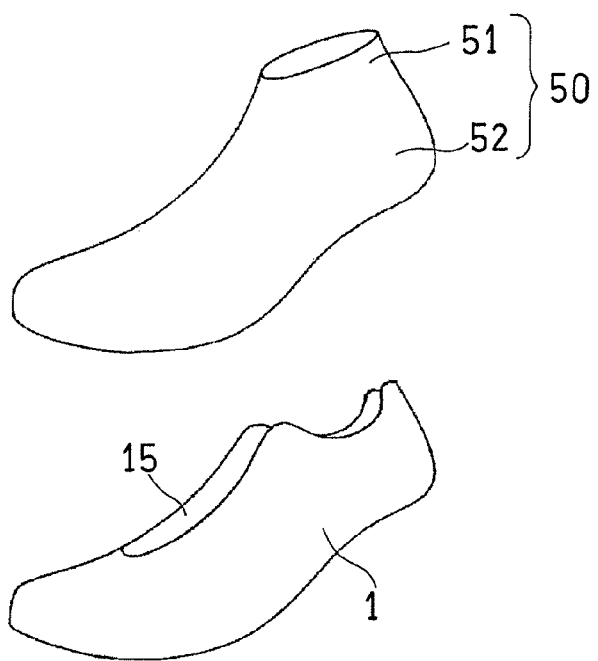
FIGS. 12A and 12B are process diagrams each showing a part of the process.

The core 50 of FIG. 12A includes a core print 51 and the last portion 52, and is used for putting the sock-shaped base member 1 forming a part of the upper on the last portion 52. The core print 51 is held between the first and second outer molds 61 and 62 of FIG. 11(*c*).

Figure 12B:
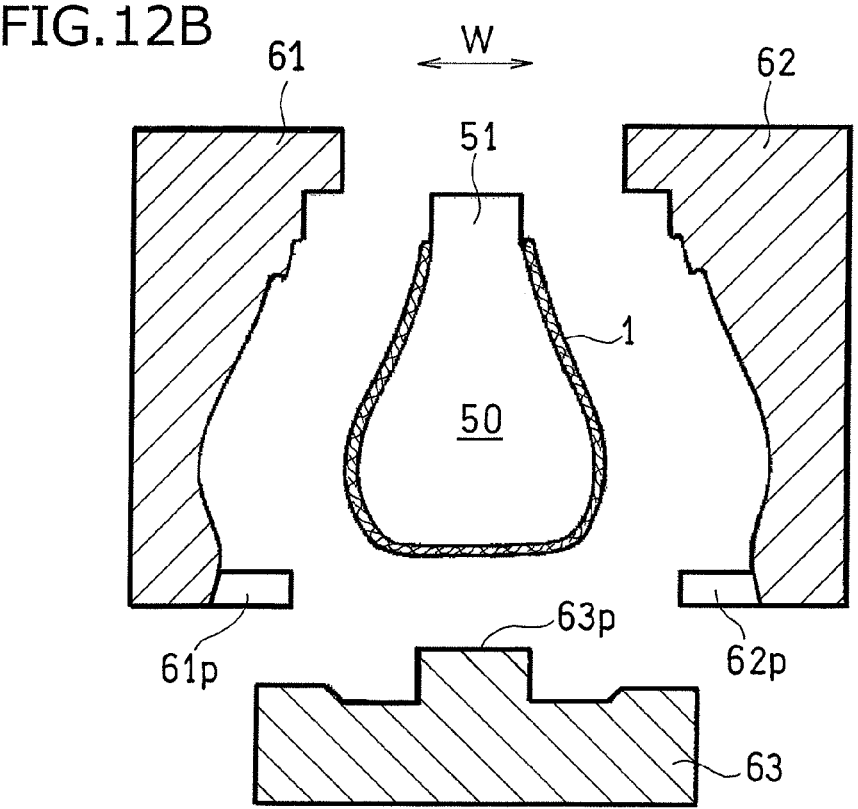

The first outer mold 61 and the second outer mold 62 of FIG. 12B mesh with each other in the width direction W. These first and second outer molds 61 and 62 have many first and second protruding portions 61*p* and 62*p*, respectively, for forming the connecting plate 33 and the through hole 34 (FIG. 1). Note that the shape of these protruding portions 61*p* and 62*p* matches the shape of the through holes 34 (FIG. 1).

The third outer mold 63 of FIG. 12B opposes the sole portion of the last portion 52. The third outer mold 63 has the third protruding portion 63*p* for forming the depressed area 30 and the cutout 36. The shape of the third protruding portion 63*p* matched with the depressed area 30 and the cutout 36.

Next, each manufacturing step will be described. First, the sock-shaped base member 1 forming a part of the upper shown in FIG. 12A is provided, and the sock-shaped base member 1 is put on the last portion 52 of the core 50, which includes the core print 51 and the last portion 52. When put on, the core print 51 is projecting from the mouth of the base member 1 in the core 50. In this step, the quarter lining 13 and the tongue 14 of FIG. 14B are not provided on the base member 1. Note that where the base member 1 is a heat-shrinkable material, the base member 1 may be heated after it is put on so that the base member 1 fits to the core 50.

In this state, the core 50 of FIG. 12B is loaded between the outer molds 61 to 63. The core 50 may be supported by the outer molds 61 to 63, or may be supported by other outer molds further provided.

Then, as shown in FIG. 13A, the first to third outer molds 61 to 63 are clamped together. In this process, the first and second outer molds 61 and 62 come closer to each other in the width direction W, whereas the third outer mold 63 comes closer to the sole portion of the core 50.

By virtue of clamping, a cavity 64 is formed between the first to third outer molds 61 to 63 and the base member 1.

Note that the core 50 and the outer molds 61 to 63 are pressed against each other with the base member 1 therebetween in areas where the reinforcement member 2 and the mid sole 3 are absent.

After being clamped, as shown in FIG. 13B, the molten resin 71 to be the reinforcement member 2 and the mid sole 3 is supplied into the cavity 64 between the first to third outer molds 61 to 63 and the base member 1. After being supplied, the molten resin 71 is cooled and cured, thereby integrally forming the reinforcement member 2 and the mid sole 3 with the base member 1.

Then, the first to third outer molds 61 to 63 are opened as shown in FIG. 13C. Here, the third outer mold 63 includes the protruding portion 63*p* projecting toward the base member 1 in the middle between the medial side Me and the lateral side La of the foot, and the depressed area 30 is formed in the center of the mid sole 3 by the protruding portion 63*p*. Thus, an intermediate shoe product 100 is produced by injection molding, where the reinforcement member 2 and the mid sole 3 are formed integrally with the base member 1 of FIG. 14A.

Note that although not shown in FIGS. 11 to 13C, the outsole 4 may be placed in advance in the third outer mold 63 and molded integrally with the mid sole 3. Alternatively, the outsole 4 may be bonded to the mid sole 3 after molding the intermediate product 100.

As shown in FIG. 14B, the shoe shown in FIG. 1 is completed by sewing the quarter lining 13 and the tongue 14 to the intermediate product 100, and further putting the innersole 5 in the shoe.

While preferred embodiments have been described above with reference to the drawings, various obvious changes and modifications will readily occur to those skilled in the art upon reading the present specification.

For example, after the intermediate product 100 of FIG. 11(f) is molded, the outsole 4 made of a urethane resin, or the like, may be molded and welded by a similar method.

In a shoe having a structure where spikes are attached to the bottom surface of the sole, e.g., a soccer shoe, the bottom surface of the mid sole may form an outsole.

Where the mid sole 3 or 3A is formed by a foamed body and has an abrasion resistance, the bottom surface of the mid sole 3 or 3A may form an outsole to be in direct contact with the road surface.

The through hole 34 may not be completely running through in the width direction W. That is, the through hole 34 may be closed in areas facing the depressed area 30. Alternatively, the opening of the through hole 34 may be narrowed in areas facing the depressed area 30. In such cases, the second mid sole 3A may be easily attached to the through hole 34.

The quarter lining 13 and the tongue 14 may be sewn to the base member 1 in advance, and the reinforcement member 2 and the mid sole 3 may be formed thereafter.

The reinforcement member 2 and the mid sole 3 may be an FRP containing reinforcement fiber.

The reinforcement member 2 extending in the circumference direction R of the foot may be cut off partially.

Note that after the molding process, the eyelets 20 may be formed at predetermined positions by a mechanical process, or the like. Moreover, when forming the reinforcement member and the mid sole, another reinforcement member for reinforcing the arch of the midfoot, for example, may be provided by insert molding.

Thus, such changes and modifications are deemed to fall within the scope of the present invention, which is defined by the appended claims.

INDUSTRIAL APPLICABILITY

The present invention is applicable to shoes having the base member 1 of a small rigidity.

REFERENCE SIGNS LIST

1: Base member 10: Bottom surface 11: Side surface
12: Upper 12h: Mouth portion 13: Quarter lining
14: Tongue 15: Opening
2: Reinforcement member 20: Eyelet 21: Lower edge
22: Upper edge portion 23: Protection section
2a: Front foot portion 2b: Middle foot portion
2c: Rear foot portion
3: (First) mid sole 3A: Second mid sole 30: Depressed area
31: Upper plate 32: Lower plate
33: Connecting plate (connecting portion) 34: Through hole
35: Heel counter 36: Cutout 37: Bridge plate
4: Outsole
5: Innersole
50: Core 51: Core print 52: Last portion
61: First outer mold 62: Second outer mold
63: Third outer mold
61p, 62p, 63p: First to third protruding portions 64: Cavity
71: Molten resin
100: Intermediate product
La: Lateral side Me: Medial side
R: Circumference direction
y: Front-rear direction
W: Width direction

The invention claimed is:

1. A shoe comprising:
a sock-shaped base member forming at least a side surface of an upper on a medial side of the shoe, a side surface of the upper on a lateral side of the shoe, and a bottom surface of the upper, the sock-shaped base member having a lattice structure;
a reinforcement member made of a thermoplastic resin attached to the side surfaces formed by the sock-shaped base member in a state where the thermoplastic resin is run into the lattice structure so that the reinforcement member is integrated with and anchored in the lattice structure of the sock-shaped base member; and
a midsole made of a non-foamed body of a thermoplastic resin attached to the bottom surface formed by the sock-shaped base member, wherein:
the midsole includes an upper plate, a lower plate, and connecting plates,
the upper plate of the midsole and the bottom surface of the upper are fixed directly to each other by a welding construction,
in fixing by the welding construction, the upper plate is attached to the bottom surface formed by the sock-shaped base member in a state where the thermoplastic forming the upper plate of the midsole is run into the lattice structure so that the upper of the midsole is integrated together with the sock-shaped base member such that it is anchored in the lattice structure, and the upper plate extends in a front-rear direction along the bottom surface,
the lower plate is placed below the upper plate while being spaced apart from the upper plate and facing the upper plate, and the lower plate extends in the front-rear direction while being divided in a medial part on the medial side of the shoe and a lateral part on the lateral side of the shoe,
the connecting plates extend in an up-down direction between the upper plate and the lower plate without being attached to the side surfaces of the upper, and are connected with the upper plate and the lower plate, and three or more connecting plates of the connecting plates are placed on each of the medial and lateral sides of the shoe,
the upper plate and the medial part of the lower plate are integrally connected with each other via the three or more connecting plates placed on the medial side of the shoe,
the upper plate and the lateral part of the lower plate are integrally connected with each other via the three or more connecting plates placed on the lateral side of the shoe,
any two connecting plates, adjacent with each other in the front-rear direction, of the three or more connecting plates placed on the medial side of the shoe are placed so as to face with each other,
any two connecting plates, adjacent with each other in the front-rear direction, of the three or more connecting plates placed on the lateral side of the shoe are placed so as to face with each other,
the upper plate, the medial part of the lower plate, and the three or more connecting plates on the medial side of the shoe each extends in a width direction of the shoe on the medial side, thereby defining a plurality of holes passing through in the width direction on the medial side of the shoe, the holes on the medial side extend in the width direction only in a part of a total width of the shoe in the width direction,
the upper plate, the lateral part of the lower plate, and the three or more connecting plates on the lateral side of the shoe each extends in the width direction of the shoe on the lateral side, thereby defining a plurality of holes passing through in the width direction on the lateral side of the shoe,
the holes on the lateral side extend in the width direction only in a part of the total width of the shoe in the width direction,
on the medial side of the shoe, each of the connecting plates on the medial side alternates with each of the holes on the medial side,
on the lateral side of the shoe, each of the connecting plates on the lateral side alternates with each of the holes on the lateral side,
the medial part and the lateral part of the lower plate are spaced apart with each other in a part between the medial and lateral sides of the shoe, the connecting plates in the medial and lateral sides of the shoe are spaced apart with each other in the part between the medial and lateral sides of the shoe, thereby the midsole defining a depressed area hollowed upwardly between the medial and lateral sides of the shoe, and
the upper plate defines a plurality of cutouts passing through in the up-down direction, and the lattice structure of the bottom surface formed by the sock-shaped base member is exposed at each of the cutouts and faces to the depressed area.

2. The shoe according to claim 1, wherein the sock-shaped base member is made of one or two or more of a knit fabric, a knit-like fabric, and a woven fabric that each has the lattice structure, or a primary member of the sock-shaped base member is one or two or more of the knit fabric, the knit-like fabric, and the woven fabric.

3. The shoe according to claim 1, wherein the medial part and the lateral part of the lower plate are continuous with each other at a front end of the midsole and at a rear end of the midsole, thereby the lower plate being continuous in a loop shape.

4. The shoe according to claim 3, wherein:
the upper plate includes a medial part placed on the medial side of the shoe, a lateral part placed on the lateral side of the shoe, and at least three bridge plates connecting the medial part and the lateral part of the upper plate, and
each of the cutouts is formed between two bridge plates, adjacent with each other, of the at least three bridge plates.

5. The shoe according to claim 4, wherein the reinforcement member covers opposing side surfaces of a midfoot, and an eyelet is formed in an upper edge portion of the reinforcement member on each of the side surfaces.

6. The shoe according to claim 4, further comprising an outsole attached to a lower surface of the midsole and having a greater abrasion resistance than the midsole.

7. The shoe according to claim 1, wherein:
the reinforcement member that is anchored in the lattice structure comprises eyelets that allow a shoelace to pass through.

8. The shoe according to claim 1, wherein the reinforcement member is welded to the sock-shaped base member.

9. The shoe according to claim 1, wherein the reinforcement member and the midsole form a single integral component that is molded in a single molding process.

10. The shoe according to claim 1, wherein the reinforcement member is more rigid than the sock-shaped base member.

11. The shoe according to claim 1, wherein:
the upper plate includes a medial part placed on the medial side of the shoe, a lateral part placed on the lateral side of the shoe, and at least three bridge plates connecting the medial part and the lateral part of the upper plate,
each of the cutouts is formed between two bridge plates, adjacent with each other, of the at least three bridge plates,
an upper surface of the depressed area is composed of the at least three bridge plates and the lattice structure of the bottom surface exposed at each of the cutouts,
the lower plate defines an opening in which the depressed area opens downwardly, and
the lattice structure and the at least three bridge plates, both composing the upper surface of the depressed area, are exposed via the opening so as to face a ground surface.

* * * * *